United States Patent [19]

Ando

[11] Patent Number: 4,903,211
[45] Date of Patent: Feb. 20, 1990

[54] ON-BOARD NAVIGATION SYSTEM FOR MOTOR VEHICLES

[75] Inventor: Hitoshi Ando, Tokorozawa, Japan

[73] Assignee: Pioneer Electronic Corporation, Tokyo, Japan

[21] Appl. No.: 248,091

[22] Filed: Sep. 23, 1988

[30] Foreign Application Priority Data

Sep. 29, 1987 [JP] Japan ............................. 62-245618
Sep. 29, 1987 [JP] Japan ............................. 62-245619

[51] Int. Cl.4 ......................................... G06F 15/50
[52] U.S. Cl. ................................. 364/443; 340/990; 340/995; 364/449
[58] Field of Search ............... 364/443, 483, 449, 707, 364/550, 424.05, 424.03; 340/988, 990, 995

[56] References Cited

U.S. PATENT DOCUMENTS

| | | |
|---|---|---|
| 3,955,185 | 5/1976 | Nishimura ........................... 364/707 |
| 4,285,043 | 8/1981 | Hashimoto et al. ................. 364/707 |
| 4,381,552 | 4/1983 | Nocilini et al. ..................... 364/707 |
| 4,417,135 | 11/1983 | Motoyama et al. ................. 364/707 |
| 4,675,676 | 6/1987 | Takanabe et al. .................. 340/990 |
| 4,698,748 | 10/1987 | Juzswik et al. .................... 364/707 |
| 4,747,041 | 5/1988 | Engel et al. ........................ 364/707 |
| 4,782,447 | 11/1988 | Ueno et al. ......................... 340/995 |
| 4,796,189 | 1/1989 | Nakayama et al. ................ 340/995 |

Primary Examiner—Gary Chin
Attorney, Agent, or Firm—Fleit, Jacobson, Cohn, Price, Holman & Stern

[57] ABSTRACT

In an on-board navigation system for motor vehicles, having a memory device in which map data in digital form is stored, and adapted to read-out from the memory device map data of a region of a given area including a present location of the vehicle while recognizing the present location of the vehicle and to display a map on a display screen on the basis of the map data, a switching device for selectively supplying an electric power to the memory device is provided. The switching device is controlled to supply the electric power to the memory device only when the map data is read-out from the memory device. A power switch for selectively supplying the power current to a display unit is also provided, thereby further reduction of the electric power consumption is possible.

2 Claims, 2 Drawing Sheets

ON-BOARD NAVIGATION SYSTEM FOR MOTOR VEHICLES

BACKGROUND OF THE INVENTION

1. Field of the Invention

The present invention relates to a navigation system to be mounted in a motor vehicle.

2. Description of Background Information

Recently, on-board navigation systems (navigation system to be mounted in a vehicle) for motor vehicles are developed, in which map data in digital form is stored in a memory and a map of a region around the present location of the vehicle is displayed on a display by reading-out from the memory map data of the region having a given area including the present location of the vehicle, while recognizing the present location of the vehicle, and the location of the vehicle itself is automatically indicated on the map being displayed.

In such navigation systems, use of a memory device is indispensable since the map data in numerical form is required, and moreover a memory device of a large memory capacity becomes necessary since the map data has a considerable data amount in order to satisfy various requirements. One the other hand, for displaying a map of a region around the vehicle on the display on the basis of data in numerical form for example, a semiconductor memory of a large capacity as well as a display unit which is operable at fast speeds become indispensable.

Therefore, the electric power consumption of the navigation system having these devices or units becomes necessarily large. However, since the capacity of electric power supply in a vehicle is limited, it is desirable to provide a measure for reducing the electric power consumption of the navigation system.

OBJECT AND SUMMARY OF THE INVENTION

The present invention is based on the above point, and an object of the present invention is to provide an on-board navigation system whose electric power consumption is much reduced.

According to the present invention, an on-board navigation system for a motor vehicle, having a memory device in which map data in digital form is stored, adapted to read-out from the memory device map data of a region of a given area including a present location of the vehicle while recognizing the present location of the vehicle and to display a map by a display unit on the basis of the map data, is constructed to have a switching device for selectively supplying an electric power to the memory device, the switching device being controlled to supply the electric power to the memory device only when the map data is read-out from the memory device.

According to another aspect of the invention, an on-board navigation system for a motor vehicle, adapted to read-out from a memory device map data of a region of a given area including a present location of the vehicle while recognizing the present location of the vehicle and to display a map by a display unit on the basis of the map data, is constructed to have a power switch for selectively supplying an electric power to the display unit which displays the map on a display screen on the basis of the map data read-out from the memory device.

DETAILED DESCRIPTION OF THE PREFERRED EMBODIMENT

The embodiment of the present invention will be described with reference to the accompanying drawings.

Figure 1:
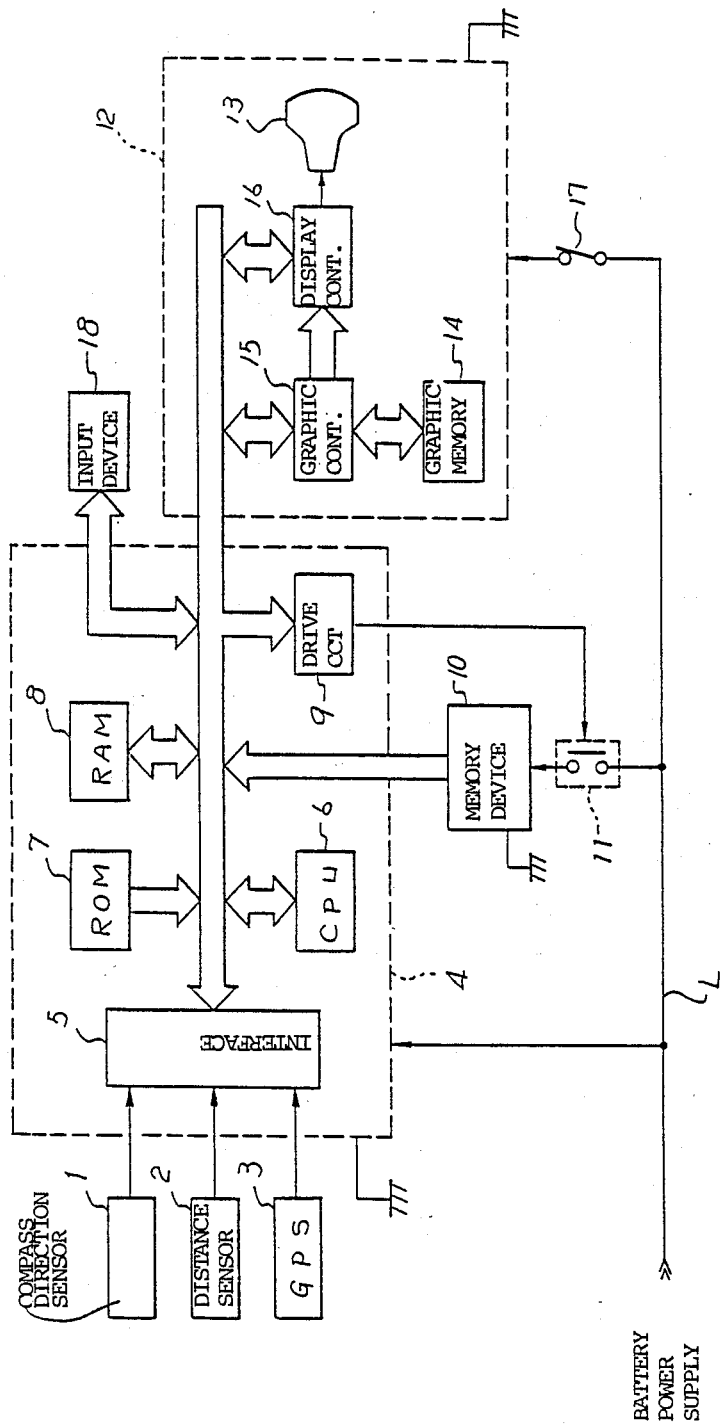
FIG. 1 is a diagram showing an embodiment of the present invention.

FIG. 1 is a block diagram showing the construction of the on-board navigation system according to the present invention. In the figure, the numeral 1 denotes a compass direction sensor which determines the direction of the vehicle on the basis of terrestrial magnetism (magnetic field of the earth), for example. The reference numeral 2 denotes a distance sensor for sensing the traveling distance of the vehicle, and the reference numeral 3 denotes a GPS (Global Positioning System) for detecting the present location of the vehicle from longitudinal and latitudinal information, etc. Detection outputs of these sensors and system are supplied to a system controller 4.

The system controller 4 is made up of an interface 5 which receives the detection outputs from the sensors (or system) 1 through 3 and performs the processes such as an A/D (Analog to Digital) conversion, a microprocessor 6 which performs various image processing operations, and operations for calculating the traveling distance of vehicle and a rate of change in the traveling direction of the vehicle with respect to the distance on the basis of output data of the sensors (or the system) 1 through 3 supplied from the interface 5, a ROM (Read Only Memory) 7 in which various processing programs of the CPU 6 and other necessary information are previously stored, a RAM (Random Access Memory) 8 into and from which information necessary for executing programs is written and read-out, and a drive circuit 9 which drives a power supply relay operating as a switching means for selectively supplying a power current to an external memory device which will be described later. To this system controller 4, the power current is supplied directly from a battery through a power supply line L.

The external memory device 10 is, for example, made up of a CD (Compact Disc) ROM having a large capacity operating as a non-volatile type storage medium for only reading purpose, and a CD-ROM decoder for driving it. To this external memory device 10, the power current is supplied from the power supply line L through a power supply relay 11. In the CD-ROM of the external memory device 10, digitized (in the numerical form) map data is stored.

When the vehicle is running the CPU 6 calculates the traveling direction of the vehicle on the basis of the output data of the compass direction sensor 1 at predetermined time intervals in accordance with interruptions by a timer, and determines the present location of the vehicle on the basis of the traveling distance and the traveling direction when interrupted by the distance sensor. The CPU 6 reads-out, from the memory device, map data of a region of a given area including the present location of the vehicle, and temporarily memorize them in the RAM 8, and also supplies them to a display device 12. Furthermore, the CPU 6 drives the power supply relay 11 through the drive circuit 9 so that the power current is supplied to the external memory device 10 only when the map data is read-out from the memory device 10.

The display unit 12 is made up of a display 13 such as a CRT, a graphic memory 14 made up of a V(Video)-RAM for example, a graphic controller 15 which draws the map data supplied from the system controller 4 in the graphic memory 14 as image data, and outputs this image data, and a display controller 16 which performs control operations to display a map on the CRT display 13 on the basis of image data outputted by the graphic controller 15. To this display unit 12, the power current is selectively supplied from the power supply line L through a power switch 17. When it is not necessary to display the map on the display 13, a user of the system can stop the supply of the power current to the display unit 12 by turning-off the power switch 17. An input device 18 such as a keyboard is provided, so that various commands and the like are supplied to the system controller 4 by keying operation of the user.

Figure 2:
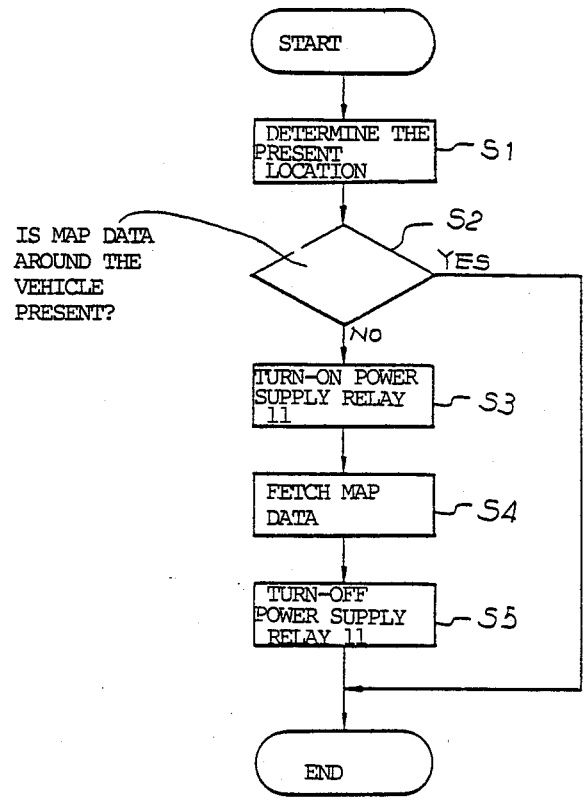
FIG. 2 is a flowchart showing the control procedure of a power supply relay executed by a CPU 6.

Referring to the flowchart of FIG. 2, the procedure for controlling the power supply relay 11 executed by the CPU 6 will be explained hereinafter.

The CPU 6 at first determines the present location of the vehicle on the basis of each output data of the compass direction sensor 1, the distance sensor 2, and the GPS 3 at a step S1. Subsequently, the CPU 6 judges whether or not map data of a region of a given area including the present location of the vehicle is written in the RAM 8, at a step S2. If it is judged that the map data around the vehicle is written, the flow is terminated without executing any operation. If, on the other hand, it is judged that the map data around the vehicle is not written, the CPU 6 turns-on the power supply relay 11, so that the power current is supplied to the external memory device 10. Then the necessary map data around the present location of the vehicle is fetched from the external memory device in sequence and written in the RAM 8 at a step S4. The writing of the map data has completed, the power supply relay 11 is turned-off (opened), to stop the supply of the power current to the external memory device 10, at a step S5. Then, the above sequential operations come to an end.

In the case of the navigation system having the external memory device 10 explained above, the electrical power consumption is relatively large although the electric power supply capacity of the vehicle is limited. Thus, as mentioned before, the reduction of electric power consumption is desired. However, the control of the power supply to the external memory device 10 is not possible for the user. Therefore, in accordance with the present invention, the power supply of the external memory device 10 is turned "on" only during the read-out operation of the map data, and the power supply is stopped in other times. By this operation, the electric power consumption of the navigation system as a whole is reduced.

In addition, a power switch 17 is provided for selectively supplying the power current to the display unit 12 which displays, on the display 13, the location of the vehicle itself together with the map around the vehicle, according to the present invention. Therefore, the power supply to the display unit 12 can be stopped if the user of the system thinks that the navigational assist is unnecessary although the present location of the vehicle is accurately recognized by the system. Thus, this operation can further contribute to the reduction of the electric power consumption of the system.

Furthermore, with the on-board navigation system, the present location of the vehicle is determined on the basis of the map data in most cases. Therefore, in such cases, the power current must be continuously supplied to the system controller 4 because it is always necessary to estimate the present location of the vehicle when the vehicle is running.

As was explained above, according to the present invention, in an on-board navigation system for a motor vehicle, having a memory device in which map data in digital form is stored, adapted to read-out from the memory device map data of a region of a given area including a present location of the vehicle while recognizing the present location of the vehicle and to display a map by a display unit on the basis of the map data, it is possible to selectively supply an electric power to the memory device only when the map data is read-out from the memory device and to stop the power supply in other times. Therefore the electric power consumption of the navigation system as a whole is reduced.

According to the second aspect of the invention, in an on-board navigation system for a motor vehicle, adapted to read-out from a memory device map data of a region of a given area including a present location of the vehicle while recognizing the present location of the vehicle and to display a map by a display unit on the basis of the map data, a power switch is provided for selectively supplying an electric power to the display unit which displays the map on a display screen on the basis of the map data read-out from the memory device so that the function of a part of the system can be stopped if the use of the system thinks it is unnecessary. Thus, this feature can further contribute to the reduction in the electric power consumption of the system as a whole.

What is claimed is:

1. An on-board navigation system for a motor vehicle, having a memory device in which map data in digital form is stored, adapted to read-out from the memory device map data of a region of a given area including a present location of the vehicle while recognizing the present location of the vehicle and to display a map by a display unit on the basis of the map data, said system comprising:
   switching means for selectively supplying electric power to the memory device; and
   control means for operating said switching means to supply the electric power to the memory device, said control means performing the operations of detecting whether or not map data around the present position of the vehicle has been stored into the memory device, and operating said switching means to supply the electric power to the memory device if it is detected that the map data around the present position of the vehicle has not been stored into the memory device.

2. The on-board navigation system of claim 1, and further comprising:
   a power switch for selectively supplying the electric power to the display unit which displays the map on the a display screen of said display unit on the basis of the map data read-out from the memory device.

* * * * *